(12) United States Patent
Jang et al.

(10) Patent No.: US 11,076,322 B2
(45) Date of Patent: Jul. 27, 2021

(54) INTERNET OF THINGS NETWORK DEVICE AND METHOD FOR EXCLUDING A BASE STATION BASED ON A RECEIVED PUSHDATA MESSAGE

(71) Applicant: SK TELECOM CO., LTD., Seoul (KR)

(72) Inventors: Jae Seong Jang, Seoul (KR); Sang Min Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 70 days.

(21) Appl. No.: 16/093,356

(22) PCT Filed: Jun. 30, 2017

(86) PCT No.: PCT/KR2017/006981
§ 371 (c)(1),
(2) Date: Oct. 12, 2018

(87) PCT Pub. No.: WO2018/048077
PCT Pub. Date: Mar. 15, 2018

(65) Prior Publication Data
US 2019/0132774 A1  May 2, 2019

(30) Foreign Application Priority Data

Sep. 12, 2016 (KR) .................. 10-2016-0117565
Sep. 19, 2016 (KR) .................. 10-2016-0119529

(51) Int. Cl.
*H04W 28/02* (2009.01)
*H04W 36/00* (2009.01)
(Continued)

(52) U.S. Cl.
CPC ......... *H04W 36/0027* (2013.01); *G16Y 30/00* (2020.01); *H04B 7/022* (2013.01);
(Continued)

(58) Field of Classification Search
CPC ..... H04L 1/0082; H04L 47/00; H04L 49/501; H04W 28/0284; G16Y 30/00
See application file for complete search history.

(56) References Cited

U.S. PATENT DOCUMENTS

2007/0070927 A1* 3/2007 Shoki ................... H04B 7/0417
                                                                370/310
2016/0073289 A1* 3/2016 Lu ..................... H04W 28/0289
                                                                370/229
(Continued)

FOREIGN PATENT DOCUMENTS

KR   10-2002-0062001 A   7/2002
KR   10-2004-0068707 A   8/2004
(Continued)

OTHER PUBLICATIONS

Augustin et al., "A Study of LoRa: Long Range & Low Power Networks for the Internet of Things", Sep. 9, 2016, pp. (Year: 2016).*

(Continued)

*Primary Examiner* — Salvador E Rivas
(74) *Attorney, Agent, or Firm* — Hauptman Ham, LLP

(57) ABSTRACT

Disclosed is technology for improving the quality of an IoT service by avoiding using a frequency band in which signal disturbance occurs and using a BS in an overload state.

7 Claims, 6 Drawing Sheets

(51) Int. Cl.
*H04B 7/08* (2006.01)
*H04W 16/00* (2009.01)
*H04L 29/08* (2006.01)
*H04B 7/022* (2017.01)
*H04L 12/931* (2013.01)
*G16Y 30/00* (2020.01)
*H04W 4/70* (2018.01)
*H04W 28/04* (2009.01)
*H04W 36/04* (2009.01)
*H04W 36/30* (2009.01)
*H04W 36/38* (2009.01)
*H04W 72/08* (2009.01)
*H04W 24/04* (2009.01)

(52) U.S. Cl.
CPC ........... *H04B 7/0817* (2013.01); *H04L 29/08* (2013.01); *H04L 49/501* (2013.01); *H04W 4/70* (2018.02); *H04W 16/00* (2013.01); *H04W 28/02* (2013.01); *H04W 28/0284* (2013.01); *H04W 28/04* (2013.01); *H04W 36/04* (2013.01); *H04W 36/30* (2013.01); *H04W 36/385* (2013.01); *H04W 24/04* (2013.01); *H04W 72/082* (2013.01)

(56) References Cited

U.S. PATENT DOCUMENTS

2017/0295519 A1* 10/2017 Xu ........................... H04W 4/06
2018/0343083 A1* 11/2018 Teboulle ............... H04W 16/10
2019/0132774 A1* 5/2019 Jang ....................... H04W 28/02

FOREIGN PATENT DOCUMENTS

| KR | 10-2004-0083861 A | 10/2004 |
| KR | 10-0842275 B1 | 6/2008 |
| KR | 10-1106102 B1 | 1/2012 |
| KR | 10-2013-0022889 A | 3/2013 |
| KR | 10-2013-0036640 A | 4/2013 |
| KR | 10-2014-0024682 A | 3/2014 |
| KR | 10-2016-0050587 A | 5/2016 |

OTHER PUBLICATIONS

Alamouti, Siavash M., "IEEE Journal on Select Areas in Communications", "A Simple Transmit Diversity Technique for Wireless Communications", Oct. 1998, pp. 1451-1458, vol. 16, No. 8.

Augustin, Aloys et al., "Sensor 2016", "A Study of LoRa: Long Range & Low Power Networks for the Internet of Things", Sep. 9, 2016, pp. 1-18, Basel, Switzerland.

Sornin, N. et al., "LoRa™ Alliance", "LoRaWAN Specification", Jan. 2015, pp. 1-82, Version: V1.0.

Korean Office Action dated Jun. 8, 2018 in connection with the counterpart Korean Patent Application No. 10-2016-0119529, citing the above reference(s).

Korean Office Action dated Dec. 13, 2018 in connection with the counterpart Korean Patent Application No. 10-2016-0117565, citing the above reference(s).

Korean Office Action dated Dec. 18, 2018 in connection with the counterpart Korean Patent Application No. 10-2016-0119529, citing the above reference(s).

* cited by examiner

[network device]

INTERNET OF THINGS NETWORK DEVICE AND METHOD FOR EXCLUDING A BASE STATION BASED ON A RECEIVED PUSHDATA MESSAGE

CROSS REFERENCE TO RELATED APPLICATION

This present application is a national stage filing under 35 U.S.C § 371 of PCT application number PCT/KR2017/006981 filed on Jun. 30, 2017 which is based upon and claims the benefit of priority to Korean Patent Application Nos. 10-2016-0117565 filed on Sep. 12, 2016 and 10-2016-0119529 filed on Sep. 19, 2016 in the Korean Intellectual Property Office. The disclosures of the above-listed applications are hereby incorporated by reference herein in their entirety.

BACKGROUND OF THE INVENTION

1. Field of the Invention

The present disclosure relates to an Internet of Things (IoT) technology. More particularly, the present disclosure relates to a technology for improving a quality of IoT service by avoiding using a frequency band in which signal disturbance occurs and using a BS in an overload state.

2. Description of the Prior Art

Internet of Things (IoT) technology for sharing information through wired/wireless network connection between objects in our lives has appeared and has been spotlighted in various fields such as health care, remote meter reading, smart homes, smart cars, and smart farms.

An IoT network structure for providing an IoT service based on the IoT technology will be briefly described below.

The IoT network consists of a remote IoT terminal, a customer terminal having an application for IoT (hereinafter, referred to as an IoT app) installed therein to identify data of the remote IoT terminal and control the IoT terminal, a network device (or an IoT app server) connecting the IoT terminal and the customer terminal (IoT app) through a wired/wireless network, and a BS serving as a gateway (hereinafter, referred to as an IoT BS) to transmit/receive packets between the IoT terminal and the network device.

In the IoT service provided in the IoT network structure, when the IoT terminal transmits an uplink packet to the network device, the IoT terminal transmits the uplink packet in a broadcast manner, and a plurality of IoT BSs receive the uplink packet and transmit the uplink packet to the network device.

Furthermore, in the IoT service, when the network device transmits a downlink packet to the IoT terminal, the network device transmits the downlink packet to one IoT BS preselected for the IoT terminal and the one IoT BS receiving the downlink packet transmits the downlink packet to the IoT terminal.

In the IoT network, it is defined to use the same uplink/downlink frequency band, and the IoT BS, which severs only as a gateway, does not adopt high-level computation.

When the IoT BS has signal disturbance due to malicious attacks from a third party or interference by another network, the IoT BS cannot change the frequency band by itself and continuously uses the same frequency band.

Furthermore, in the IoT network, the IoT BS cannot perform any operation except for dropping the downlink packet in an overload state, so a success rate of reception of the downlink packet is not consistent and influenced by the state of the IoT device.

Accordingly, the present disclosure improves a quality of the IoT service by proposing a new method of avoiding using the frequency band in which signal disturbance occurs and using the BS in an overload state.

SUMMARY OF THE INVENTION

The present disclosure has been made in order to improve the quality of an IoT service by avoiding using a frequency band in which signal disturbance occurs and using a BS in an overload state.

In accordance with an aspect of the present disclosure, an Internet of Things (IoT) network device is provided. The IoT network device includes: a packet receiver configured to receive uplink packets of a terminal through two or more Base Stations (BSs); an identification unit configured to identify a specific BS having an error in packet transmission/reception from the two or more BSs; and a controller configured to, when the specific BS is identified, exclude the specific BS from the two or more BSs for processing an uplink packet of the terminal or transmitting a downlink packet for the terminal.

In accordance with another aspect of the present disclosure, an Internet of Things (IoT) network device is provided. The IoT network device includes: a packet receiver configured to receive uplink packets of a terminal through two or more Base Stations (BSs); an identification unit configured to identify whether there is a specific BS having signal disturbance from the two or more BSs; and a controller configured to, when the specific BS is identified, use an uplink packet received through a remaining BS except for the specific BS from the two or more BSs for processing an uplink packet of the terminal.

Specifically, the identification unit may identify, when a specific message including information on at least one frequency band in which signal disturbance occurs is received from a BS, the BS as the specific BS.

Specifically, when the specific BS is identified, the controller may change a frequency band of two or more BSs for packet transmission/reception into another frequency band in which no signal disturbance occurs Specifically, the controller may transmit a control message to the terminal through a BS selected from the remaining BS to change a transmission frequency band to the another frequency band, thereby the frequency band of the two or more BSs for packet transmission/reception of the terminal being able to be changed into the another frequency band receiving the uplink packet of the terminal.

In accordance with another aspect of the present disclosure, a method of operating an Internet of Things (IoT) network device is provided. The method includes: receiving uplink packets of a terminal through two or more BSs; identifying whether there is a specific BS having signal disturbance from the two or more BSs; and using, when the specific BS is identified, an uplink packet received through a remaining BS except for the specific BS from the two or more BSs for processing an uplink packet of the terminal.

Specifically, the method may further includes changing, when the specific BS is identified, a frequency band of the two or more BSs for packet transmission/reception into another frequency band in which no signal disturbance occurs.

Specifically, the changing may comprise transmitting a control message to the terminal through a BS selected from the remaining BS to change a transmission frequency band to the another frequency band, thereby the frequency band of the two or more BSs for packet transmission/reception of the terminal being able to be changed into the another frequency band receiving the uplink packet of the terminal.

In accordance with another aspect of the present disclosure, an Internet of Things (IoT) network device is provided. The Internet of Things (IoT) network device includes: a packet receiver configured to receive uplink packets of a terminal through two or more Base Stations (BSs); an identification unit configured to identify whether there is a specific BS being overloaded from the two or more BSs; and a controller configured to, when the specific BS is identified, exclude the specific BS from the two or more BSs for selection of a BS for transmitting a downlink packet of the terminal.

Specifically, the controller may select the BS from remaining BSs except for the specific BS from the two or more BSs for transmitting the downlink packet of the terminal, the BS having the best channel state (Signal to Noise Ratio (SNR)) with the terminal.

Specifically, the identification unit may identify, when a specific message including information related to generation of overload is received from a BS, the BS as the specific BS.

Specifically, the controller may use an uplink packet received through the specific BS among uplink packets received through the two or more BSs when processing the uplink packets of the terminal.

In accordance with another aspect of the present disclosure, a method of operating an Internet of Things (IoT) network device is provided. The method includes: receiving uplink packets of a terminal through two or more Base Stations (BSs); identifying whether there is a specific BS being overloaded from the two or more BSs; and selecting, when the specific BS is identified, a BS for transmitting a downlink packet of the terminal by excluding the specific BS from the two or more BSs.

Specifically, the selecting may include selecting the BS from remaining BSs except for the specific BS from the two or more BSs for transmitting the downlink packet of the terminal, the BS having the best channel state (Signal to Noise Ratio (SNR)) with the terminal.

According to the present disclosure as described above, it is possible to derive an effect of improving the quality of the IoT service by avoiding using the frequency band in which signal disturbance occurs and using the IoT BS in the overload state.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
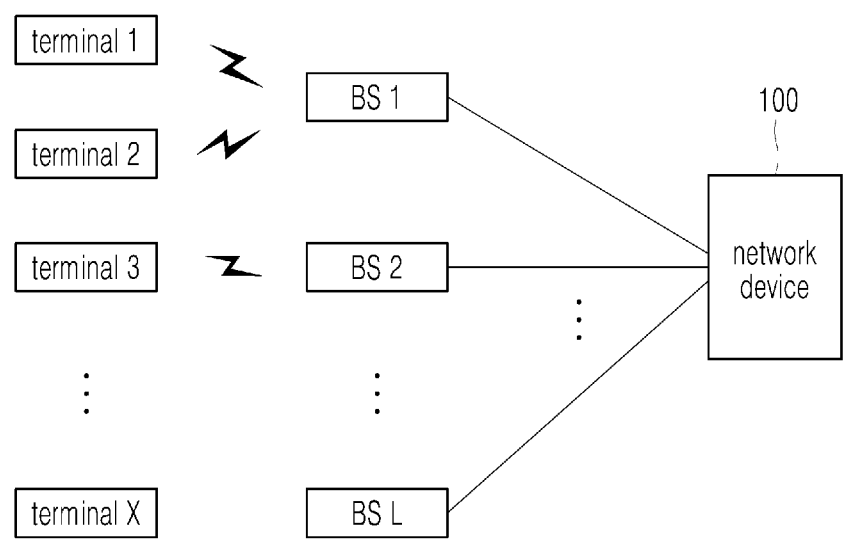
FIG. 1 illustrates an IoT network structure to which the present disclosure is applied.

It should be noted that the technical terms as used herein are merely used for describing particular embodiments, and are not intended to limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the technical idea should not be construed as being limited by the accompanying drawings.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

Hereinafter, embodiments of the present disclosure will be described with reference to the accompanying drawings.

FIG. 1 illustrates a structure of an Internet of Things (IoT) network to which the present disclosure is applied.

As illustrated in FIG. 1, the structure of the IoT network includes remote IoT terminals (for example, terminals 1, 2, . . . X), a customer terminal (not shown) having an IoT application installed therein to identify data of the remote IoT terminal and control the IoT terminal, a network device 100 (IoT app server) for connecting the IoT terminal and the customer terminal (IoT app) through a wired/wireless network, and IoT Base Stations (for example, BSs 1, 2, . . . L) serving as gateways to perform packet transmission/reception between the IoT terminal and the network device 100.

An uplink/downlink packet transmission process of the IoT service provided in the IoT network structure will be briefly described below.

First, when the IoT terminal transmits an uplink packet to the network device, the IoT terminal transmits the uplink packet in a broadcast manner, and a plurality of IoT BSs receive the uplink packet and transmit the uplink packet to the network device.

Further, when the network device transmits a downlink packet to the IoT terminal, the network device transmits the downlink packet to one IoT BS preselected for the IoT terminal and the one IoT BS receiving the downlink packet transmits the downlink packet to the IoT terminal.

Since a frequency of an unlicensed band is used in the IoT network, signal disturbance due to malicious attacks (jamming) by a third party or interference of another network easily occurs.

However, in the current IoT network, it is defined to use the same uplink/downlink frequency band and the IoT BS serves only as the gateway but does not adopt high-level computation, so that the IoT BS cannot change the frequency band by itself even though signal disturbance occurs in the IoT BS.

As a result, the IoT device continuously uses the frequency band in which signal disturbance occurs, and thus a success rate of reception of the uplink/downlink packet rapidly decreases, which causes a problem of deterioration of quality of the IoT service.

Meanwhile, in the current IoT network, since the IoT BS serves only as the gateway but has not adopted high-level computation, the IoT BS cannot prevent the downlink packet from being received from the IoT network device by itself even though the IoT BS is in an overload state.

The downlink packet is transmitted only through one IoT BS (downlink BS). However, when the downlink BS is in the overload state, the downlink BS cannot perform any operation except for dropping the downlink packet, so that the success rate of reception of the downlink packet is not consistent and is influenced by the state of the downlink BS.

Accordingly, the present disclosure proposes a new method of avoiding using the frequency band in which signal disturbance occurs and using the IoT BS in the overload state, thereby improving the quality of the IoT service.

Hereinafter, the IoT network device for implementing the method proposed by the present disclosure will be described in detail.

Figure 2:
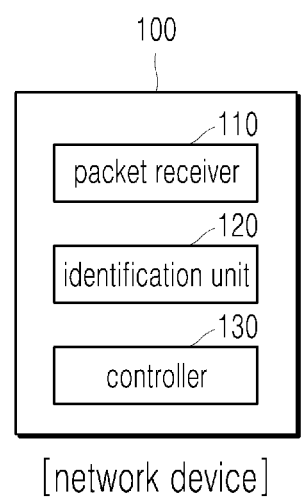
FIG. 2 is a block diagram illustrating the configuration of an IoT network device according to an embodiment of the present disclosure.

The IoT network device (hereinafter, referred to as a network device) according to an embodiment of the present disclosure will be described in detail with reference to FIG. 2.

The network device 100 according to the present disclosure includes a packet receiver 110 configured to receive uplink packets of a terminal through two or more BSs, an identification unit 120 configured to identify whether there is a specific BS having errors in packet transmission/reception from the two or more BSs, and a controller 130 configured to, when the specific BS is identified, exclude the specific BS from the two or more BSs for processing the uplink packet of the terminal or transmitting the downlink packet of the terminal.

Here, the terminal is the IoT terminal (for example, terminal 1, 2, . . . X) described in FIG. 1.

Hereinafter, for convenience of description, the IoT terminal, that is, one of the terminals 1, 2, . . . X, for example, terminal 1 will be described.

Meanwhile, the present disclosure proposes a method of avoiding using the frequency band in which signal disturbance occurs and using the IoT BS in the overload state in the IoT network, and accordingly, the BS described above and below is understood as an IoT BS serving as a gateway.

The packet receiver 110 receives the uplink packet of terminal 1 through two or more BSs.

As described above, in the IoT network, when the IoT terminal transmits an uplink packet to the network device, the IoT terminal transmits the uplink packet in a broadcast manner, and a plurality of IoT BSs receive the uplink packet and transmit the uplink packet to the network device.

Accordingly, when terminal 1, which is the IoT terminal, transmits the uplink packet in a broadcast manner, the plurality of IoT BSs around terminal 1 may receive the uplink packet of terminal 1 and transmit the uplink packet of terminal 1 to the network device 100.

The network device 100, that is, the packet receiver 110 receives the uplink packet of terminal 1 through the two or more BSs, that is, the plurality of BSs.

Hereinafter, for convenience of description, BSs 1, 2, and 3 illustrated in FIG. 1 will be described as the two or more BSs receiving the uplink packet of terminal 1 and transmitting the uplink packet to the network device 100.

That is, when terminal 1 transmits the uplink packet in a broadcast manner through one channel (frequency band F1) of the frequency on the unlicensed band used for the IoT service, it is assumed hereinafter that a plurality of IoT BSs, that is, BSs 1, 2, and 3 receive the uplink packet of terminal 1 through frequency band F1 around terminal 1 and transmit the uplink packet of terminal 1 to the network device 100.

Meanwhile, as described above, when the IoT network device transmits the downlink packet to the IoT terminal in the IoT network, the IoT network device transmits the downlink packet to one IoT BS (hereinafter, referred to as a downlink BS) pre-selected for the IoT terminal and the one downlink BS receiving the downlink packet transmits the downlink packet to the IoT terminal.

To this end, the IoT network selects one downlink BS for the IoT terminal. That is, the IoT network selects an IoT BS with the best channel state (Signal to Noise Ratio (SNR)) for the corresponding IoT terminal as the downlink BS from a plurality of IoT BSs having received the uplink packet of the IoT terminal and transmitted the uplink packet to the IoT network.

Accordingly, the network device 100 selects, as the downlink BS, the BS having the best channel state (SNR) for terminal 1 from the plurality of BSs 1, 2, and 3 having received the uplink packet of terminal 1 and transmitted the uplink packet to the network device 100.

Hereinafter, for convenience of description, it is assumed that terminal 1 is located closest to BS 3 and thus BS 3 has the best channel state (SNR) for terminal 1 among BSs 1, 2, and 3.

In this case, the network device 100 selects BS 3 as the downlink BS among the plurality of BSs 1, 2, and 3 and transmits the downlink packet to one downlink BS 3 when the downlink packet (for example, ACK or a control command) for terminal 1 is generated, and the one downlink BS 3 having received the downlink packet transmits the downlink packet to terminal 1.

The identification unit 120 identifies whether there is a specific BS having an error in packet transmission/reception among the two or more BSs, for example, BSs 1, 2, and 3 having transmitted the uplink packet of terminal 1 to the network device 100.

When the specific BS is identified by the identification unit 120, the controller 130 excludes the identified specific BS among BSs 1, 2, and 3 for processing the uplink packet of terminal 1 or transmitting the downlink packet of terminal 1.

That is, the controller 130 excludes the specific BS having the error in packet transmission/reception from BSs 1, 2, and 3 having transmitted the uplink packet of terminal 1 to the network device 100 for processing the uplink packet of terminal 1 or transmitting the downlink packet of terminal 1.

At this time, the error in packet transmission/reception may refer to signal disturbance in the frequency band used for transmitting/receiving the uplink/downlink packet or an overload state of the IoT BS.

Hereinafter, it is assumed that the error in packet transmission/reception is signal disturbance according to an embodiment of the present disclosure.

The identification unit 120 identifies whether there is a specific BS having signal disturbance from the two or more BSs, for example, BSs 1, 2, and 3 having transmitted the uplink packet of terminal 1 to the network device 100.

Specifically, a process of identifying whether there is the specific BS having signal disturbance will be described below.

When signal disturbance due to malicious attacks by a third party near the IoT BS or interference by another network occurs, the IoT BS may detect the occurrence of signal disturbance.

For example, the IoT BS may monitor a channel state (Signal to Noise Ratio (SNR)) of each frequency band (F1, F2, . . . ) for each channel with respect to all frequencies on the unlicensed band used for the IoT service, and when there is a frequency band having the channel state (SNR), which rapidly becomes bad or becomes equal to or lower than a threshold value, determine that signal disturbance occurs in the corresponding frequency band.

Of course, the IoT BS may detect the occurrence of signal disturbance by various methods.

When the IoT BS has detected the occurrence of signal disturbance, the IoT BS may transmit a specific message including information on at least one frequency band with signal disturbance to the network device 100.

It is preferable that the specific message is a PUSH DATA message according to a protocol between the IoT BS and the network device 100.

Information on at least one frequency band with signal disturbance is identification information (for example, a center frequency) of the frequency band (channel) in which signal disturbance occurs.

If the number of frequency bands (channels) in which signal disturbance occurs is plural, the information on at least one frequency band in which signal disturbance occurs may include an array of identification information (for example, center frequencies) of the plurality of frequency bands (channels).

The protocol between the IoT BS and the network device 100 is a Gateway Message Protocol (GWMP). It has not been defined in current IoT technology that the IoT BS detects signal disturbance and informs the network device 100 of the signal disturbance.

Accordingly, the present disclosure newly defines that the IoT BS informs the network device 100 of the signal disturbance through the PUSH DATA message according to the GWMP standard of protocol between the IoT BS and the network device 100, which is not defined in the current IoT technology.

That is, according to the present disclosure, the IoT BS having detected signal disturbance may transmit the PUSH DATA message of the GWMP standard including information on at least one frequency band in which signal disturbance occurs to the network device 100, thereby informing the network device 100 of the signal disturbance by.

When the network device 100 receives a specific message, that is, the PUSH DATA message according to the GWMP standard including information on at least one frequency band in which signal disturbance occurs from a BS among BSs 1, 2, and 3, the network device 100, that is, the identification unit 120 identifies the BS as a specific BS.

Hereinafter, for convenience of description, it is assumed that BS 3 detects signal disturbance in a frequency band F1 and transmits a PUSH DATA message including information on the frequency band F1 (a center frequency of the frequency band F1) to the network device 100.

In this case, the identification unit 120 may identify, as the specific BS, BS 3 transmitting the PUSH DATA message including information (single identification information) on the frequency band F1 in which signal disturbance occurs among BSs 1, 2, and 3 and further identify the frequency band F1 with signal disturbance from the PUSH DATA message.

When the specific BS, for example, BS 3 is identified among BSs 1, 2, and 3, the controller 130 uses only the uplink packet received through the remaining BSs 1 and 2 except for BS 3 among BSs 1, 2, and 3 in processing of the uplink packet of terminal 1.

That is, when the uplink packet of the IoT terminal is received through a plurality of IoT BSs, the network device 100 maps/maintains uplink packet-based data to the corresponding IoT terminal and thus allows the customer terminal to identify data of the IoT terminal and control the IoT terminal. Further, the network device 100 performs all processes for uplink packet processing for the IoT service using uplink packets received through a plurality of IoT BSs like selecting the IoT BS for transmitting the downlink packet based on the uplink packet.

When performing all processes of uplink packet processing of terminal 1 for the IoT service as described above, the controller 130 excludes BS 3 for processing the uplink packet of terminal 1 by dropping the uplink packet received through BS 3 having signal disturbance among BSs 1, 2, and 3 and using only the uplink packets received through the remaining BSs 1 and 2.

This is to prevent deterioration of quality of the IoT service by dropping the uplink packet received through BS 3 without using it, since reliability of the uplink packet of terminal 1 received through BS 3 with signal disturbance is low.

Further, since the same uplink packet of terminal 1 is received through other BSs 1 and 2 even though the uplink packet of terminal 1 received through BS 3 with signal disturbance is dropped without being used in the IoT network, there is no problem with normally providing the IoT service.

Further, the network device 100 according to the present disclosure changes the frequency band of the IoT BS in order to avoid signal disturbance which is the fundamental causes of deterioration of reliability for the uplink packet of terminal 1 received through BS 3.

More specifically, when the specific BS, that is, BS 3 is identified, the controller 130 changes the frequency band which BSs 1, 2, and 3 use for packet transmission/reception of terminal 1 into another frequency band in which no signal disturbance occurs.

That is, the frequency band which BSs 1, 2, and 3 use for packet transmission/reception of terminal 1 is the frequency band F1, so that the controller 130 changes the frequency band which BSs 1, 2, and 3 use for packet transmission/reception of terminal 1 from the current frequency band F1 into another frequency band in which no signal disturbance occurs.

As described above, the IoT BS cannot change the frequency band by itself in the IoT network.

Meanwhile, signaling to change the transmission frequency band of the IoT terminal based on the network is defined in the IoT network.

Accordingly, the present disclosure changes the frequency band of the IoT BS through signaling to change the transmission frequency band of the IoT terminal.

More specifically, the controller 130 transmits, to terminal 1, a control message to change the transmission frequency into another frequency band through the BS selected from the remaining BSs 1 and 2 except for BS 3 with signal disturbance among BSs 1, 2, and 3.

At this time, the control message refers to signaling (Modification Channel Req/Resp) to change the transmission frequency band of the IoT terminal based on the network in the IoT network.

Further, the BS selected from the remaining BSs 1 and 2 is a BS having the best channel state (Signal to Noise Ratio (SNR)) with terminal 1 among the remaining BSs 1 and 2.

As described above, the controller 130 drops the uplink packet received through BS 3 with signal disturbance among BSs 1, 2, and 3 and uses only the uplink packet received through the remaining BSs 1 and 2.

Accordingly, in the process of selecting the IoT BS for downlink packet transmission based on the uplink packet of terminal 1, the controller 130 selects one BS having the best channel state (SNR) with terminal 1 from the remaining BSs 1 and 2 except for BS 3 among BSs 1, 2, and 3.

Hereinafter, for convenience of description, it is assumed that BS 2 is selected.

When BS 2 is selected as the IoT BS for downlink transmission of terminal 1, the downlink packet for terminal 1 generated in the network device 100 is transmitted to terminal 1 through BS 2 before the selection for the BS is changed.

In this case, the controller 130 transmits a control message to change the transmission frequency band used by terminal 1 from the current frequency band F1 to another frequency band (for example, a frequency band F2) through the selected BS 2.

When the network device 100 transmits the control message, that is, the downlink packet to BS 2, BS 2 transmits the downlink packet (control message) to terminal 1 through the frequency band F1 and terminal 1 successfully receives the downlink packet (control message) since BS 2 detects no signal disturbance in the frequency band F1.

Terminal 1 changes the transmission frequency band from the current frequency band F1 to another frequency band (for example, the frequency band F2) according to the control message received from the network device 100 and transmits the uplink packet to be generated later in a broadcast manner through the changed frequency band F2.

Accordingly, even though BS 3 has signal disturbance in the frequency band F1, all of BSs 1, 2, and 3 can receive the uplink packets of terminal 1 through the frequency band F2 in which no signal disturbance occurs near terminal 1 and transmit the uplink packets to the network device 100 since the signal disturbance occurs in each frequency band.

In the process of selecting the IoT BS for downlink packet transmission based on the uplink packet of terminal 1, the network device 100 selects one BS having the best channel state (SNR) with terminal 1, that is, the best channel state (SNR) of the frequency band F2 among BSs 1, 2, and 3 and transmits the downlink packet of terminal 1 to the selected BS.

In the IoT network, it is defined to use the same uplink/downlink frequency band.

The BS (one of BSs 1, 2, and 3) selected as the downlink BS of terminal 1 by the network device 100 receives the downlink packet of terminal 1 and transmits the downlink packet to terminal 1 through the frequency band F2 like in reception of the uplink packet.

As described above, when the IoT BS having signal disturbance informs the network of the signal disturbance, the transmission frequency band of the IoT terminal may be changed using network-based signaling, so that the frequency band of the IoT BS may be naturally changed according to the characteristics that the same uplink/downlink frequency band is used in the IoT network.

As a result, in the present disclosure, the change in the frequency band of the IoT BS based on the network is implemented using signaling for changing the transmission frequency band of the IoT terminal based on the network.

As described above, according to the present disclosure, it is possible to derive an effect of improving the quality of the IoT service by performing a method of changing the frequency band of the IoT BS, where the method is suitable for the IoT network and capable of changing the frequency band of the IoT BS with signal disturbance.

Meanwhile, the present disclosure may implement the change in the frequency band of the IoT terminal even though the IoT terminal has signal disturbance occurring due to malicious attacks (jamming) by a third party or interference by another network.

For example, when the channel state (SNR) of the currently used transmission frequency band is monitored and the channel state (SNR) rapidly becomes bad or decreases to be equal to or lower than a threshold value, the IoT terminal may detect the occurrence of signal disturbance in the current transmission frequency band.

Of course, the IoT terminal detects the occurrence of signal disturbance in various ways.

Since the IoT terminal can change the frequency band by itself in the current IoT technology, when the IoT terminal detects the occurrence of signal disturbance in the current transmission frequency band, the IoT terminal changes the transmission frequency band into another frequency band among unlicensed frequencies used for the IoT service and then transmits the uplink packet in a broadcast manner through the changed transmission frequency band.

Particularly, when the method of changing the frequency band of the IoT BS according to the present disclosure is applied to the IoT technology (Long Range (LoRa), which is specialized in transmission at a low speed (<1 kbps) and transmission of a small amount of data that supports low power in the wide coverage, among IoT technologies, it may be expected to further improve the quality of the IoT service as the change in the frequency band of the IoT BS based on the network is possible.

Meanwhile, another embodiment of the present disclosure will be described below for the case where the IoT BS is overloaded as errors in packet transmission/reception.

The identification unit 120 identifies whether there is a specific BS in an overload state among the two or more BSs, for example, BSs 1, 2, and 3 having transmitted the uplink packet of terminal 1 to the network device 100.

A process of identifying whether there is the specific BS in the overload state will be described below in detail.

The BS may detect whether its own state is the overload state.

For example, the BS may detect that its own state is the overload state, when the number of terminals (IoT terminals) simultaneously transmitting/receiving packets through the BS is larger than or equal to a threshold number, uplink/downlink traffic of packets simultaneously transmitted/received through the BS is larger than or equal to a threshold value, frequency resources used (allocated) in unlicensed band frequencies used for the IoT service are larger than or equal to a threshold value, or a predefined error is identified.

Of course, the BS detects that its own state is the overload state in various ways.

The BS detecting its own state as the overload state may transmit a specific message including information related to generation of the overload to the network device 100.

It is preferable that the specific message is a PUSH DATA message defined by a protocol between the BS and the network device 100.

It is preferable that the information related to generation of the overload is information on whether the state is an overload state (true) or an overload-released state (false).

When the protocol between the BS and the network device 100 is a Gateway Message Protocol (GWMP), the BS detecting its own overload state may insert information (true) related to generation of the overload into the existing field or a newly added field of the PUSH DATA message defined in the GWMP and transmit the PUSH DATA message to the network device 100.

In the current IoT technology, the part in which the BS detects the overload state and informs the network device 100 of the overload state has not been defined.

Accordingly, the present disclosure newly defines the part in which the BS informs the network device 100 of the overload state that is not defined in the current IoT technology through the PUSH DATA message according to the protocol between the IoT BS and the network device 100, that is, the GWMP standard.

That is, according to the present disclosure, the BS detecting the overload state may inform the network device 100 of generation of the overload through the PUSH DATA message in the GWMP standard.

The network device 100, that is, identification unit 120 identifies, as a specific BS (hereinafter, an overload BS), a BS transmitting a specific message, that is, the PUSH DATA message according to the GWMP standard including information (true) on generation of the overload among BSs 1, 2, and 3.

Hereinafter, it is assumed that BS 3 transmits the PUSH DATA message including information (true) related to generation of the overload to the network device 100 for convenience of description.

In this case, the identification unit 120 may identify BS3 as the specific BS, that is, the overload BS, where it is BS 3 that transmits the PUSH DATA message including information (true) related to generation of the overload among BSs 1, 2, and 3.

When the overload BS (for example, BS 3) is identified among BSs 1, 2, and 3, the controller 130 excludes BS 3 from selection of a BS for transmitting the downlink packet of terminal 1 from among BSs 1, 2, and 3.

That is, when the overload BS, which has been overloaded, for example, BS 3 is identified by the identification unit 120, the controller 130 excludes the overload BS 3 from BSs 1, 2, and 3 from selection of the downlink BS of terminal 1, so as to exclude BS 3 from targets to be used for transmitting the downlink packet of terminal 1.

The controller 130 selects the BS having the best channel state (SNR) with terminal 1 from the remaining BSs 1 and 2 except for the overload BS 3 among BSs 1, 2, and 3 transmitting the uplink packet of terminal 1 and transmitting the uplink packet to the network device 100.

Hereinafter, for convenience of description, it is assumed that BS 2 has the best channel state (SNR) with terminal 1 among BSs 1 and 2.

In this case, the network device 100 selects, as the downlink BS, BS 2 having the best channel state (SNR) with terminal 1 among the remaining BSs 1 and 2 except for BS 3, which has the best channel state (SNR) with terminal 1 but is in the overload state among the plurality of BSs 1, 2, and 3, and transmits the downlink packet to one downlink BS 2 when the downlink packet (for example, ACK or a control command) for terminal 1 is generated, and the one downlink BS 2 having received the downlink packet transmits the downlink packet to terminal 1.

Considering that BSs 1, 2, and 3 receive the uplink packets of terminal 1 near terminal 1, there is no major problem with transmitting the downlink packets of terminal 1 to terminal 1 no matter which one of BSs 1, 2, and 3 is selected as the downlink BS. There is only difference in quality due to difference in the channel state (SNR) with terminal 1.

Accordingly, even though BS 2 is selected as the downlink BS instead of BS 3 having the best channel state (SNR) with terminal 1 from among the plurality of BSs 1, 2, and 3 as described above, the downlink packet of terminal 1 may be normally received by terminal 1 through BS 2.

As described above, the network device 100 according to the present disclosure prevents the BS in the overload state from being used for transmitting the downlink packet of the IoT terminal by excluding the BS in the overload state from selection of the downlink BS for the IoT terminal.

Meanwhile, even if BS 3 is in the overload state, the uplink packet of terminal 1 received through BS 3 has no problem of reliability once it has been normally received by the network device 100.

Accordingly, for processing the uplink packet of terminal 1, the controller 130 may also use the uplink packet received through the overload BS 3 among uplink packets received through the two or more BSs, that is, BSs 1, 2, and 3.

That is, when the uplink packet of the IoT terminal is received through a plurality of BSs, the network device 100 maps/maintains uplink packet-based data to the corresponding IoT terminal and thus allows the customer terminal to identify data of the IoT terminal and control the IoT terminal. Further, the network device 100 performs all processes for uplink packet processing for the IoT service using uplink packets received through a plurality of IoT BSs like selecting the IoT BS for transmitting the downlink packet based on the uplink packet.

At this time, when the uplink packets of terminal 1 are received through BSs 1, 2, and 3, the controller 130 normally receives/uses all of the uplink packets received through BSs 1, 2, and 3 without separately processing the uplink packet received through BS 3, which is overloaded, among BSs 1, 2, and 3 for performing all processes of processing the uplink packet of terminal 1 for the IoT service.

As described above, according to the present disclosure, the BS in the overload state is excluded from selection of the downlink BS for the IoT terminal and thus the downlink packet is not transmitted to the IoT terminal through the BS in the overload BS. As a result, the use of the BS in the overload state is avoided.

Accordingly, the state of the BS is considered in the present disclosure, so that it is possible to avoid using the BS in the overload state for transmitting the downlink packet to the IoT terminal.

Therefore, in the present disclosure, it is possible to prevent the downlink packet of the IoT terminal transmitted by the IoT network device from being dropped by the BS and thus a success rate of reception of the downlink packet can be also consistently good like the uplink packet.

Meanwhile, like the part in which the BS informs the network device 100 of the overload state, the part in which the BS informs the network device 100 of release of the overload state is newly defined using a PUSH DATA message according to a protocol between the BS and the network device 100, that is, the GWMP standard in the present disclosure.

That is, the BS detecting the release of its own overload state may insert information (false) related to the release of the overload into the existing field or a newly added field of the PUSH DATA message defined in the GWMP and transmit the PUSH DATA message to the network device 100.

When the PUSH DATA message including information (true) related to release of the overload is received from the overload BS 3, the network device 100 identifies that the overload state of BS 3 is released and selects the BS having the best channel state (SNR) with terminal 1 from among BSs 1, 2, and 3 without excluding BS 3 from selection of the downlink BS of terminal 1.

As described above, according to the present disclosure, the BS in the overload state is excluded from selection of the downlink BS for the IoT terminal and thus the downlink packet is not transmitted to the IoT terminal through the BS in the overload BS. As a result, the use of the BS in the overload state is avoided.

Accordingly, in the present disclosure, it is possible to avoid using the BS in the overload state for transmitting the downlink packet to the IoT terminal in consideration of the state of the BS, thereby preventing the downlink packet of the IoT terminal from being dropped by the BS and making a success rate of reception of the downlink packet consistently good.

As described above, according to the present disclosure, it is possible to derive an effect of improving the quality of the IoT service by implementing a downlink packet transmission method suitable for the IoT network to avoid using the BS in the overload state for transmitting the downlink packet to the IoT terminal.

Particularly, when the present disclosure is applied to the IoT technology (Long Range (LoRa), which is specialized in transmission at a low speed (<1 kbps) and transmission of a small amount of data that supports low power in the wide coverage, among IoT technologies, it may be expected to further improve the quality of the IoT service by taking the success rate of reception of the downlink packet to a level of the success rate of reception of the uplink packet.

Hereinafter, a situation in which the IoT BS avoids (changes) the frequency band in which signal disturbance occurs according to the present disclosure will be described with reference to FIG. 3.

For convenience of description, when terminal 1 transmits the uplink packet in a broadcast manner through one channel (frequency band F1) of the frequency on the unlicensed band used for the IoT service, it is assumed hereinafter that BSs 1, 2, and 3 receiving the uplink packet of terminal 1 through frequency band F1 around terminal 1 transmit the uplink packet of terminal 1 to the network device 100.

That is, terminal 1 transmits the uplink packet in the broadcast manner through the frequency band F1 in S10, and BSs 1, 2, and 3 receiving the uplink packet of terminal 1 through the frequency band F1 around terminal 1 transmit the uplink packet to the network device 100.

At this time, when BS 3 detects the occurrence of signal disturbance in the frequency band F1 in S20, BS 3 may inform the network device 100 of the signal disturbance by transmitting a PUSH DATA message in the GWMP standard including information on the frequency band F1 in which signal disturbance occurs (center frequency of the frequency band F1) to the network device 100 in S30.

Then, the network device 100 may identify BS 3 having signal disturbance among BSs 1, 2, and 3 having transmitted the uplink packet of terminal 1 based on the PUSH DATA message and identify the frequency band F1 in which signal disturbance occurs in S40.

The network device 100 uses only the uplink packets received through the remaining BSs 1 and 2 except for BS 3 for processing the uplink packet of terminal 1 in S60 among BSs 1, 2, and 3 having received the uplink packets, which terminal 1 transmits through the frequency band F1, and transmitted the uplink packets to the network device 100 in S50.

That is, for performing all processes of processing the uplink packet of terminal 1 for the IoT service, the network device 100 drops the uplink packet received through BS 3 having signal disturbance and uses only the uplink packets received through the remaining BSs 1 and 2 among BSs 1, 2, and 3.

The network device 100 selects one BS having the best channel state (SNR) with terminal 1 from among the remaining BSs 1 and 2 except for BS 3 among BSs 1, 2, and 3 during the process of selecting the downlink BS for transmitting the downlink packet based on the uplink packet of terminal 1 in S70.

Hereinafter, for convenience of description, it is assumed that BS 2 is selected.

When BS 2 is selected as the downlink BS for transmitting the downlink packet of terminal 1, the network device 100 transmits a control message to change the transmission frequency band used by terminal 1 from the current frequency band F1 to another frequency band (for example, a frequency band F2) to terminal 1 through the selected BS 2 in S80.

When the network device 100 transmits the control message, that is, the downlink packet to BS 2 in S80, BS 2 transmits the downlink packet (control message) to terminal 1 through the frequency band F1.

At this time, since BS 2 detects no signal disturbance in the frequency band F1, the downlink packet (control message) is normally received by terminal 1 in S90.

Terminal 1 changes the transmission frequency band from the current frequency band F1 to another frequency band (for example, the frequency band F2) according to a channel index within the control message (Modification Channel Req) received from the network device 100 in S100, and then transmits the uplink packet including a response message (Modification Channel Resp) of the control message in a broadcast manner through the changed frequency band F2 in S110.

Even though BS 3 has signal disturbance in the frequency band F1, all of BSs 1, 2, and 3 can receive the uplink packets of terminal 1 through the frequency band F2 in which no signal disturbance occurs near terminal 1 and transmit the uplink packets to the network device 100 since the signal disturbance occurs in each frequency band.

Figure 5:
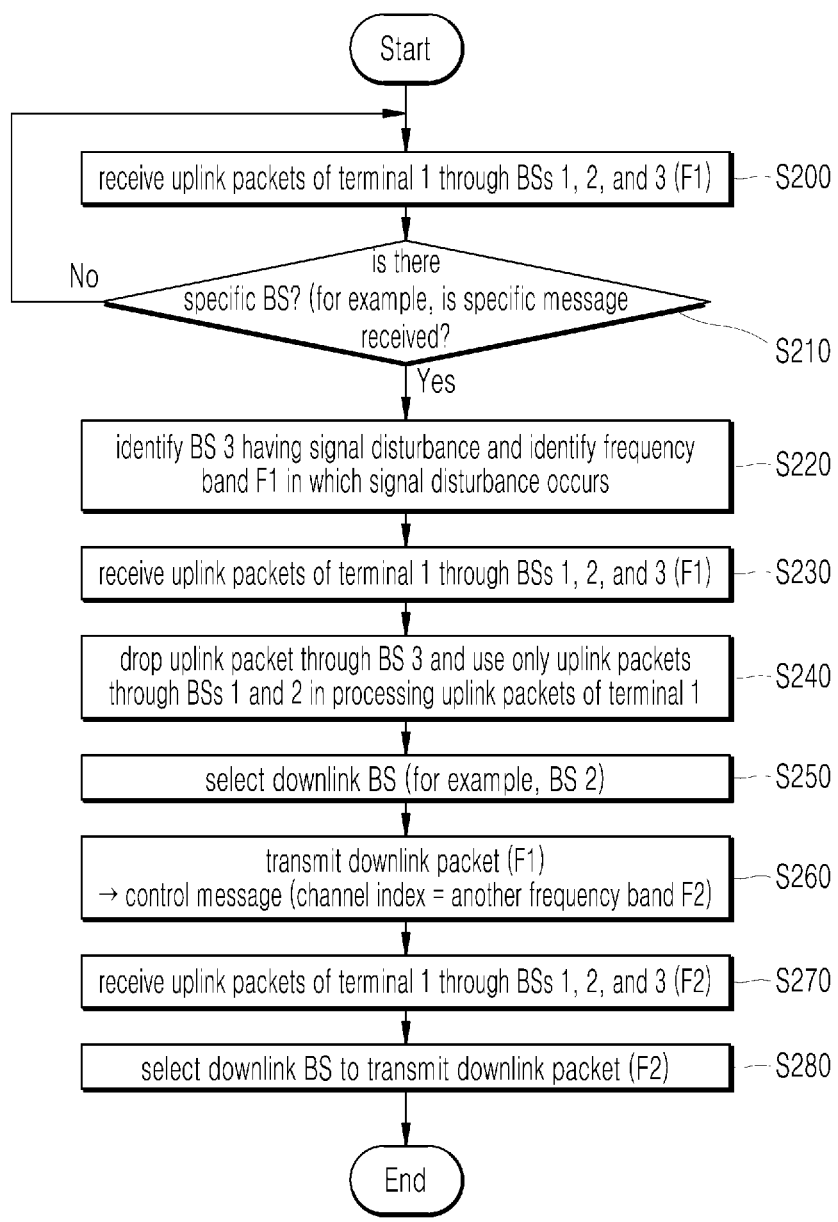
FIG. 5 is a flowchart illustrating a method of operating an IoT network device according to an embodiment of the present disclosure.

Hereinafter, a method of operating the IoT network device according to an embodiment of the present disclosure will be described with reference to FIG. 5.

Figure 3:
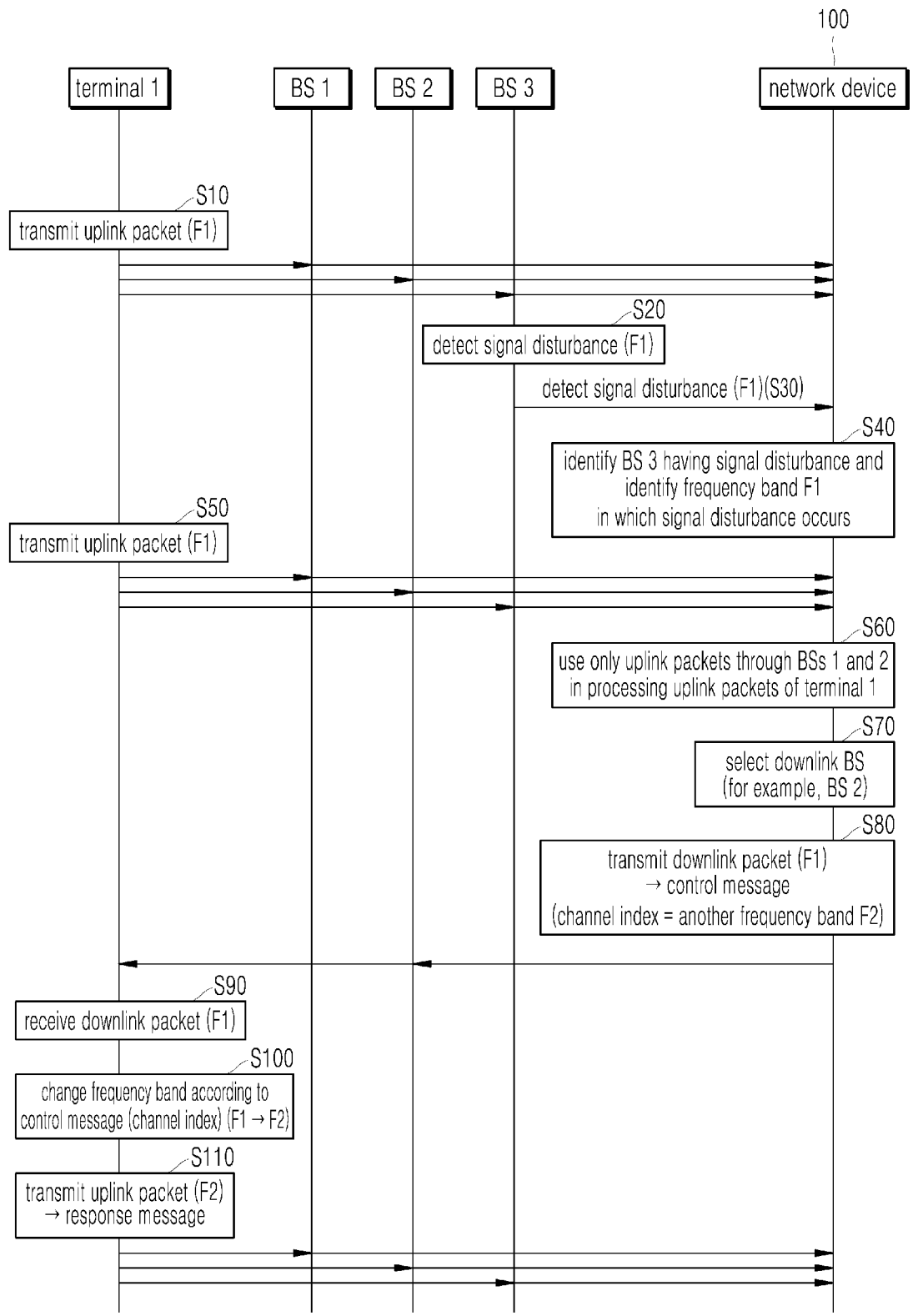
FIG. 3 illustrates a situation in which an IoT BS avoids (changes) a frequency band in which signal disturbance occurs according to the present disclosure.

Like the description with reference to FIG. 3, it is assumed that, when terminal 1 transmits the uplink packet in the broadcast manner through the frequency band F1, BSs 1, 2, and 3 receiving the uplink packet of terminal 1 through the frequency band F1 around terminal 1 transmit the uplink packet of terminal 1 to the network device 100.

That is, in the method of operating the network device 100 according to the present disclosure, the uplink packets, which terminal 1 has transmitted through the frequency band F1, are received through BSs 1, 2, and 3 in S200.

In the method of operating the network device 100 according to the present disclosure, it is identified whether there is a specific BS having signal disturbance among BSs 1, 2, and 3 in S210.

That is, in the method of operating the network device 100 according to the present disclosure, when there is a BS transmitting a specific message, that is, a PUSH DATA message according to the GWMP standard including information on at least one frequency band in which signal disturbance occurs among BSs 1, 2, and 3 (Yes of S210), the BS may be identified as the specific BS.

Hereinafter, for convenience of description, it is assumed that BS 3 detects signal disturbance in a frequency band F1 and transmits a PUSH DATA message including information on the frequency band F1 (a center frequency of the frequency band F1) to the network device 100.

In this case, in the method of operating the network device 100 according to the present disclosure, BS 3 transmitting the PUSH DATA message including information (single identification information) on the frequency band F1 in which signal disturbance occurs among BSs 1, 2, and 3 may be identified as the specific BS and the frequency F1 in which signal disturbance occurs may be further identified from the PUSH DATA message in S220.

Thereafter, in the method of operating the network device 100 according to the present disclosure, when the uplink packets which terminal 1 transmits through the frequency band F1 are received through BSs 1, 2, and 3 in S230, only the uplink packets received through the remaining BSs 1 and 2 except for BS 3 may be used for processing the uplink packets of terminal 1 among BSs 1, 2, and 3 in S240.

That is, in the method of operating the network device 100 according to the present disclosure, for performing all processes of processing the uplink packets of terminal 1 for the IoT service, the uplink packet received through BS 3 having signal disturbance is dropped and only the uplink packets received through the remaining BSs 1 and 2 among BSs 1, 2, and 3 are used.

Further, in the method of operating the network device 100 according to the present disclosure, the frequency band of the IoT BS is changed in order to avoid signal disturbance which is the fundamental causes of deterioration of reliability for the uplink packet of terminal 1 received through BS 3.

More specifically, in the method of operating the network device 100 according to the present disclosure, when BS 3 having signal disturbance is identified, a control message to change the transmission frequency band to another frequency band is transmitted to terminal 1 through the selected BS among the remaining BSs 1 and 2 except for BS 3 having signal disturbance among BSs 1, 2, and 3 in S250 and S260.

At this time, the control message refers to signaling (Modification Channel Req/Resp) to change the transmission frequency band of the IoT terminal based on the network in the IoT network.

Further, the selected BS among the remaining BSs 1 and 2 may be a BS having the best channel state (SNR) with terminal 1 among the remaining BSs 1 and 2.

As described above, in the method of operating the network device 100 according to the present disclosure, for performing all processes of processing the uplink packets of terminal 1 for the IoT service, the uplink packet received through BS 3 having signal disturbance is dropped and only the uplink packets received through the remaining BSs 1 and 2 among BSs 1, 2, and 3 are used.

Accordingly, in the method of operating the network device 100 according to the present disclosure, during the process of selecting the IoT BS for transmitting the downlink packet based on the uplink packet of terminal 1, one BS having the best channel state (SNR) with terminal 1 is selected from among the remaining BSs 1 and 2 except for BS 3 among BSs 1, 2, and 3 in S250.

Hereinafter, for convenience of description, it is assumed that BS 2 is selected.

In this case, in the method of operating the network device 100 according to the present disclosure, the control message (Modification Channel Req) to change the transmission frequency band used by terminal 1 from the current frequency band F1 to another frequency band (for example, the frequency band F2) is transmitted to terminal 1 through the selected BS 2 in S260.

When the network device 100 transmits the control message, that is, the downlink packet to BS 2, BS 2 transmits the downlink packet (control message) to terminal 1 through the frequency band F1 and terminal 1 successfully receives the downlink packet (control message) since BS 2 detects no signal disturbance in the frequency band F1.

Terminal 1 changes the transmission frequency band from the current frequency band F1 to another frequency band (for example, the frequency band F2) according to a channel index within the control message received from the network device 100 and transmits the uplink packet to be generated since then in a broadcast manner through the changed frequency band F2.

Accordingly, even though BS 3 has signal disturbance in the frequency band F1, all of BSs 1, 2, and 3 can receive the uplink packets of terminal 1 through the frequency band F2 in which no signal disturbance occurs near terminal 1 and transmit the uplink packets to the network device 100 since the signal disturbance occurs in each frequency band.

Accordingly, in the method of operating the network device 100 according to the present disclosure, the uplink packets, which terminal 1 has transmitted through the frequency band F2, are received from BSs 1, 2, and 3 in S270.

In the method of operating the network device 100 according to the present disclosure, during the process of selecting the IoT BS for downlink packet transmission based on the uplink packet of terminal 1, one BS having the best channel state (SNR) with terminal 1, that is, the best channel state (SNR) of the frequency band F2 is selected from among BSs 1, 2, and 3 and the downlink packet of terminal 1 is transmitted to the selected BS in S280.

In the IoT network, it is defined to use the same uplink/downlink frequency band.

The BS (one of BSs 1, 2, and 3) selected as the downlink BS of terminal 1 by the network device 100 and receiving the downlink packet of terminal 1 transmits the downlink packet to terminal 1 through the frequency band F2 like in reception of the uplink packet.

Hereinafter, a situation of avoiding the IoT BS in the overload state to transmit the downlink packet according to the present disclosure will be described with reference to FIG. 4.

For convenience of description, it is assumed that, when terminal 1 transmits uplink packets, BSs 1, 2, and 3 around terminal 1 receiving the uplink packets of terminal 1 transmit the uplink packets of terminal 1 to the network device 100.

That is, terminal 1 transmits the uplink packets in the broadcast manner in S10, and BSs 1, 2, and 3 receiving the uplink packets of terminal 1 around terminal 1 transmit the uplink packets to the network device 100.

When BS 3 detects its own overload state in S21, BS 3 may inform the network device 100 of generation of the overload by transmitting a specific message, that is, a PUSH DATA message according to the GWMP standard including information (true) related to generation of the overload to the network device 100 in S31.

The network device 100 may identify BS 3, which has been overloaded, among BSs 1, 2, and 3 transmitting the uplink packets of terminal 1 based on the PUSH DATA message in S41.

When the overload BS, for example, BS 3 is identified in S41, the network device 100 excludes the overload BS 3 from BSs 1, 2, and 3 when selecting the downlink BS of terminal 1 after the time point at which the overload BS is identified.

More specifically, terminal 1, which does not know the overload state of BS 3, still transmits the uplink packets in the broadcast manner in S50, and thus upon receiving the uplink packets, BSs 1, 2, and 3 transmit the uplink packets to the network device 100.

At this time, even if BS 3 is in the overload state, the uplink packet of terminal 1 received through BS 3 has no problem of reliability once it has been normally received by the network device 100.

When the uplink packets of terminal 1 are received through BSs 1, 2, and 3 even after the time point at which the overload BS 3 is identified, the network device 100 normally receives/uses all of the uplink packets received through BSs 1, 2, and 3 without separately processing the uplink packet received through BS 3, which has been overloaded, among BSs 1, 2, and 3 for performing all processes of processing the uplink packet of terminal 1 for the IoT service in S61.

On the other hand, after the time point at which the overload BS 3 is identified, the BS having the best channel state (SNR) with terminal 1 is selected from among the remaining BSs 1 and 2 except for the overload BS 3 among BSs 1, 2, and 3 receiving the uplink packets of terminal 1 and transmitting the uplink packets to the network device 100 in S71.

Hereinafter, for convenience of description, it is assumed that BS 2 has the best channel state (SNR) with terminal 1 among BSs 1 and 2 since terminal 1 is next closest to BS 2 after BS 3.

In this case, the network device 100 selects, as the downlink BS, BS 2 having the best channel state (SNR) with terminal 1 among the remaining BSs 1 and 2 except for BS 3, which has the best channel state (SNR) with terminal 1 but is in the overload state among the plurality of BSs 1, 2, and 3, in S71 and transmits the downlink packet to one downlink BS 2 when the downlink packet (for example, ACK or a control command) for terminal 1 is generated in S81, and the one downlink BS 2 having received the downlink packet transmits the downlink packet to terminal 1.

Considering that the uplink packets of terminal 1 are received near terminal 1, there is no major problem with transmitting the downlink packets of terminal 1 to terminal 1 no matter which one of BSs 1, 2, and 3 is selected as the downlink BS but there is only difference in quality due to difference in the channel state (SNR) with terminal 1.

Accordingly, even though BS 2 is selected as the downlink BS instead of BS 3 having the best channel state (SNR) with terminal 1 among the plurality of BSs 1, 2, and 3 as described above, the downlink packet of terminal 1 may be normally received by terminal 1 through BS 2 in S91.

Figure 6:
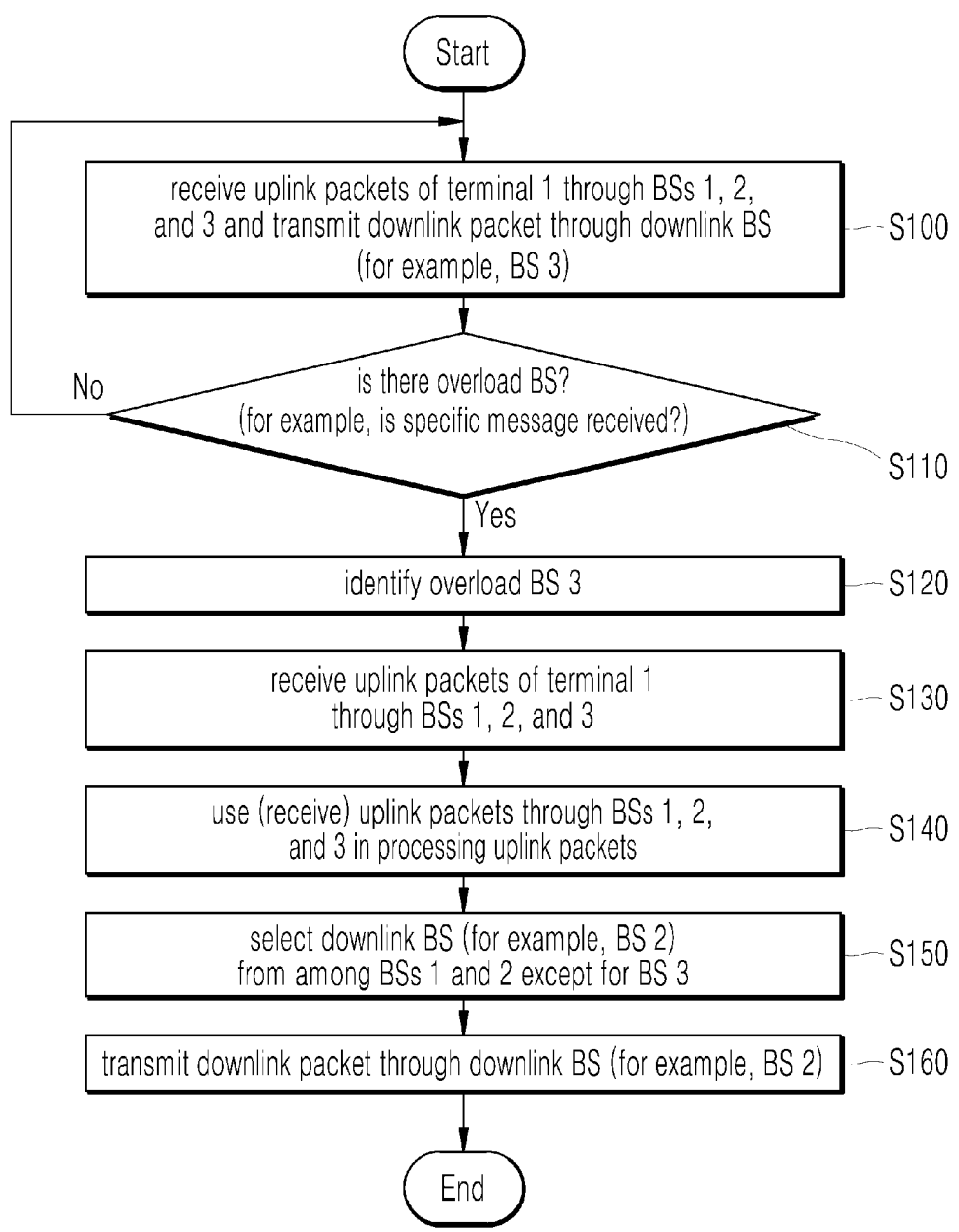
FIG. 6 is a flowchart illustrating the method of operating the IoT network device according to another embodiment of the present disclosure.

Hereinafter, a method of operating the IoT network device according to an embodiment of the present disclosure will be described with reference to FIG. 6.

Figure 4:
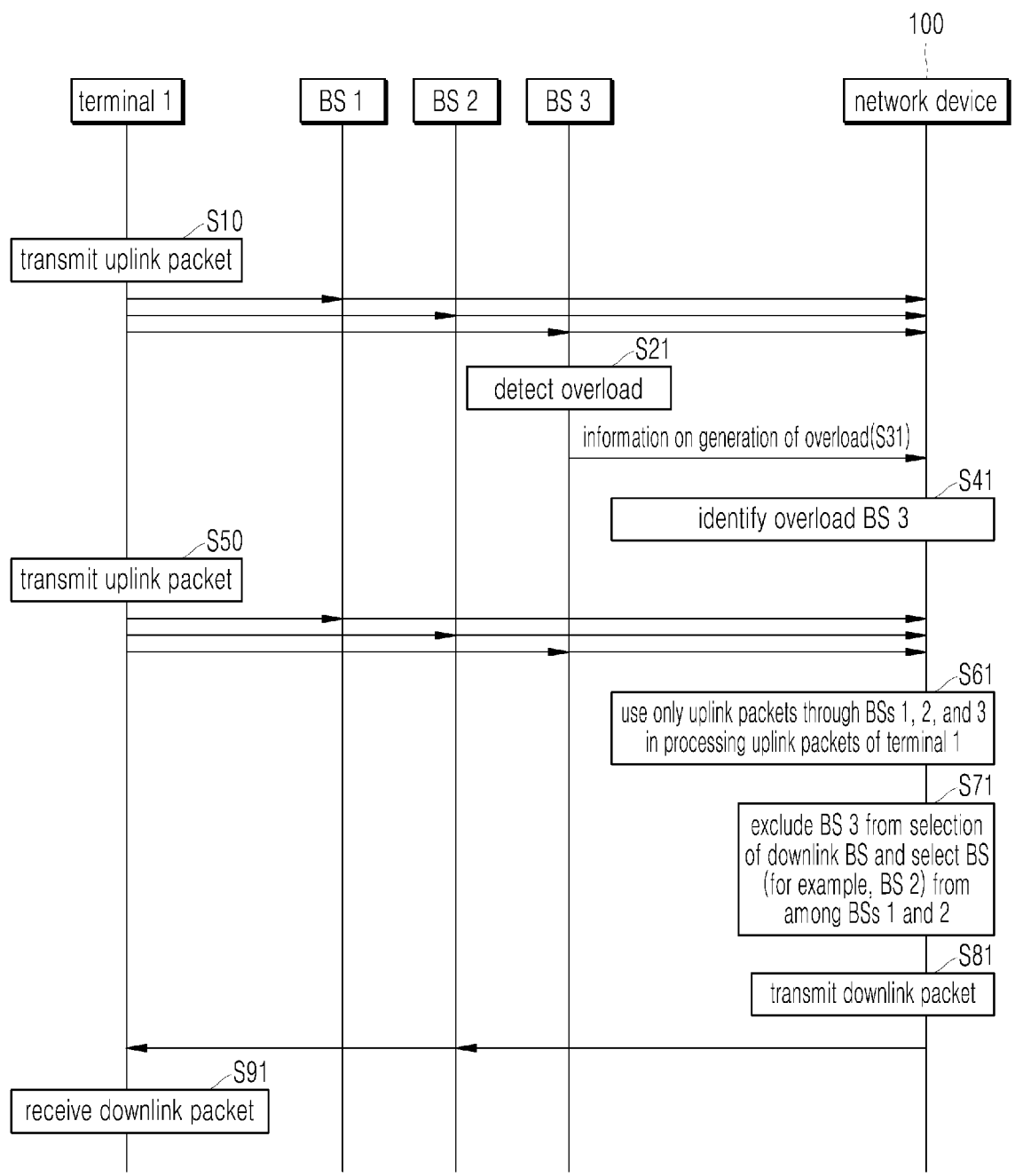
FIG. 4 illustrates a situation of avoiding an IoT BS in an overload state to transmit a downlink packet according to the present disclosure.

Like the description with reference to FIG. 4, it is assumed that, when terminal 1 transmits the uplink packets in the broadcast manner, BSs 1, 2, and 3 receiving the uplink packets of terminal 1 around terminal 1 transmit the uplink packets of terminal 1 to the network device 100.

That is, in the method of operating the network device 100 according to the present disclosure, the uplink packets, which terminal 1 has transmitted, are received through BSs 1, 2, and 3 in S100.

Based on the premise that there is no overload BS among BSs 1, 2, and 3, when the downlink packet (for example, ACK or a control command) for terminal 1 is generated, the downlink packet is transmitted to the downlink BS (for example, BS 3) having the best channel state (SNR) with terminal 1 among BSs 1, 2, and 3, and the one downlink BS 3 receiving the downlink packet transmits the downlink packet to terminal 1 in S100 in the method of operating the network device 100 according to the present disclosure.

When the uplink packets of terminal 1 are received through the plurality of BSs 1, 2, and 3 and the uplink packet of terminal 1 is transmitted through one pre-selected downlink BS 3, it is identified whether there is a specific BS, which is overloaded, that is, an overload BS among BSs 1, 2, and 3 in the method of operating the network device 100 according to the present disclosure in S110.

In the method of operating the network device 100 according to the present disclosure, a BS transmitting a specific message, that is, a PUSH DATA message according to the GWMP standard including information (true) related to generation of the overload is identified as a specific BS (hereinafter, an overload BS) among BSs 1, 2, and 3 (Yes of S110).

Hereinafter, it is assumed that BS 3 transmits the PUSH DATA message including information (true) related to generation of the overload to the network device 100 for convenience of description.

In this case, in the method of operating the network device 100 according to the present disclosure, BS 3 is identified as the specific BS, that is, the overload BS in S120, and the overload BS 3 is excluded from BSs 1, 2, and 3 when selecting the downlink BS for transmitting the downlink packet of terminal 1 after the time point at which the overload BS is identified.

More specifically, terminal 1, which does not know the overload state of BS 3, still transmits the uplink packets in the broadcast manner, and thus upon receiving the uplink packets of terminal 1, BSs 1, 2, and 3 located near terminal 1 transmit the uplink packets to the network device 100.

Accordingly, in the method of operating the network device 100 according to the present disclosure, even if BS 3 is in the overload state, the uplink packets of terminal 1 may be received through BS 3 as well as BSs 1 and 3 in S130.

When the uplink packets of terminal 1 are received through BSs 1, 2, and 3 even after the time point at which the overload BS 3 is identified, all of the uplink packets received through BSs 1, 2, and 3 are normally received/used without separately processing the uplink packet received through BS 3, which has been overloaded, among BSs 1, 2, and 3 for performing all processes of processing the uplink packet of terminal 1 for the IoT service in S140 in the method of operating the network device 100 according to the present disclosure.

On the other hand, after the time point at which the overload BS 3 is identified, the BS having the best channel state (SNR) with terminal 1 is selected from the remaining BSs 1 and 2 except for the overload BS 3 among BSs 1, 2, and 3, which receive the uplink packets of terminal 1 and transmit the uplink packets to the network device 100 in S150 in the method of operating the network device 100 according to the present disclosure.

Hereinafter, for convenience of description, it is assumed that BS 2 has the best channel state (SNR) with terminal 1 among BSs 1 and 2 since terminal 1 is next closest to BS 2 after BS 3.

In this case, in the method of operating the network device 100 according to the present disclosure, BS 2 having the best channel state (SNR) with terminal is selected as the downlink BS from among the remaining BSs 1 and 2 except for BS 3, which has the best channel state (SNR) with terminal 1 among BSs 1, 2, and 3 but is in the overload state in S160.

Accordingly, in the method of operating the network device 100 according to the present disclosure, when the downlink packet (for example, ACK or a control command) for terminal 1 is generated, the downlink packet is transmitted to the downlink BS 2 and the downlink BS 2 receiving the downlink packet transmits the downlink packet to terminal 1 in S160.

According to the present disclosure as described above, it is possible to derive an effect of improving the quality of the IoT service by avoiding using the frequency band in which signal disturbance occurs and using the IoT BS in the overload state.

The implementations of the functional operations and subject matter described in the present disclosure may be realized by a digital electronic circuit, by the structure described in the present disclosure and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a standalone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should not be understood that the operations are performed in the shown specific sequence or that all shown operations are performed in order to obtain a preferable result. In a specific case, a multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. An Internet of Things (IoT) network device comprising:
   a packet receiver configured to receive uplink packets of a terminal through a plurality of Base Stations (BSs);
   an identification unit configured to identify a specific BS having an error in packet reception from the plurality of BSs; and
   a controller configured to, when the specific BS is identified, exclude the specific BS from the plurality of BSs for transmitting a downlink packet for the terminal,
   wherein the identification unit identifies, when a specific message including information related to generation of overload is received from a BS, the BS as the specific BS, and
   wherein the specific message is a PUSH DATA message according to a Gateway Message Protocol (GWMP) standard between the specific BS and the IoT network device.

2. The IoT network device of claim 1, wherein the error comprises signal disturbance.

3. An Internet of Things (IoT) network device comprising:
   a packet receiver configured to receive uplink packets of a terminal through a plurality of Base Stations (BSs);
   an identification unit configured to identify whether there is a specific BS being overloaded from the plurality of BSs; and
   a controller configured to, when the specific BS is identified, exclude the specific BS from the plurality of BSs for selection of a BS for transmitting a downlink packet of the terminal,
   wherein the identification unit identifies, when a specific message including information related to generation of overload is received from a BS, the BS as the specific BS, and
   wherein the specific message is a PUSH DATA message according to a Gateway Message Protocol (GWMP) standard between the BS and the IoT network device.

4. The IoT network device of claim 3, wherein the controller selects the BS from remaining BS s except for the specific BS from the plurality of BS s for transmitting the downlink packet of the terminal, the BS having the best channel state (Signal to Noise Ratio (SNR)) with the terminal.

5. The IoT network device of claim 3, wherein the controller uses an uplink packet received through the specific BS among uplink packets received through the plurality of BS s when processing the uplink packets of the terminal.

6. A method of operating an Internet of Things (IoT) network device, the method comprising:
   receiving uplink packets of a terminal through a plurality of Base Stations (BSs);
   identifying whether there is a specific BS being overloaded from the plurality of BSs; and
   selecting, when the specific BS is identified, a BS for transmitting a downlink packet of the terminal by excluding the specific BS from the BSs,
   wherein when a specific message including information related to generation of overload is received from a BS, the BS as the specific BS, and wherein the specific message is a PUSH DATA message according to a Gateway Message Protocol (GWMP) standard between the BS and the IoT network device.

7. The method of claim 6, wherein the selecting comprises selecting the BS from remaining BSs except for the specific BS from the plurality of BSs for transmitting the downlink packet of the terminal, the BS having the best channel state (Signal to Noise Ratio (SNR)) with the terminal.

* * * * *